United States Patent [19]

Dolamore

[11] 4,050,444
[45] Sept. 27, 1977

[54] REFLECTIVE DEVICE

[76] Inventor: Peter William Dolamore, P.O. Box 10142, Johannesburg, South Africa

[21] Appl. No.: 579,850

[22] Filed: May 22, 1975

[30] Foreign Application Priority Data

May 22, 1974 South Africa ............... 74/3309

[51] Int. Cl.² ................................. F24J 3/02
[52] U.S. Cl. ................................. 126/271; 136/89 R; 136/206; 350/293; 350/299
[58] Field of Search .............. 126/270, 271; 237/1 A; 350/293, 299, 301, 302, 303, 306; 136/89, 206

[56] References Cited

U.S. PATENT DOCUMENTS

| 2,961,926 | 11/1960 | Hoffmeister | 350/293 |
|---|---|---|---|
| 3,058,394 | 10/1962 | Edlin | 126/270 |
| 3,174,397 | 3/1965 | Sanborn | 126/270 |
| 3,176,678 | 4/1965 | Langley | 126/270 |
| 3,225,208 | 12/1965 | Wolfe | 126/270 |
| 3,613,659 | 10/1971 | Phillips | 126/270 |
| 3,841,738 | 10/1974 | Caplan | 126/271 |
| 3,868,823 | 3/1975 | Russell, Jr. | 126/270 |
| 3,875,926 | 4/1975 | Frank | 126/271 |
| 3,892,476 | 7/1975 | Sherman, Jr. | 350/293 |

Primary Examiner—Kenneth W. Sprague
Attorney, Agent, or Firm—Burns, Doane, Swecker & Mathis

[57] ABSTRACT

The invention provides for a linear reflective device having a plurality of concave reflective regions disposed along a reference line, such that normal incident light is focussed to a focal region by all of the reflective regions. The reflective device may be curved in a direction normal to the reference line or be planar. The invention further provides a method and means for manufacturing the reflective device by rolling, pressing, or molding. The invention still further provides optical, radio, or acoustical apparatus having the reflective device.

11 Claims, 4 Drawing Figures

REFLECTIVE DEVICE

BACKGROUND TO THE INVENTION

This invention relates to a reflective device. It relates further to a method of, and means for, manufacturing the device, as well as to apparatus utilising the device.

According to the invention there is provided a reflective device which includes a plurality of reflective regions, the regions each being concave to have the same co-incident focal region and the reflective regions being disposed adjacent each other in a stepped arrangement along a reference line to have a linear extended configuration.

The device may include a plurality of sets of reflective regions having a different focal region, the device having as many focal regions as there are sets of reflective regions. In one arrangement, the reflective regions of one set may be disposed alternately with the reflective regions of another set, in a zig-zag fashion.

The reflective regions may have a linear cross-section in a plane perpendicular to the reference line, the focal region being linear and the device having a substantially planar configuration. Alternatively, all the reflective regions may have a concave cross-section in a plane perpendicular to the reference line, the focal region being a focal point.

The device may include a matrix of dished reflective regions, each reflective region being curved in two dimensions, the reflective regions being disposed along parallel reference lines lying in a plane, to form a planar device having a matrix of focal points.

Preferably, the reflective regions may be parabolic.

The device may be of silvered glass, a synthetic plastics material, or of metal. Accordingly, the device may be particularly adapted to reflect either electro-magnetic or acoustic waves.

The invention extends further to a receiver or transmitter for electro-magnetic or acoustical waves having a reflective device according to the invention.

In particular, the receiver may be an energy concentrator such as a solar heater having a reflective device according to the invention, which has focal lines, and a plurality of pipes containing a fluid to be heated arranged co-incidentally with the focal lines.

The invention still further provides a method of manufacturing a reflective device according to the invention, which includes pressing or rolling a sheet of a suitable material, such as metal, with suitable dies or rollers or includes moulding the device in a suitable mould from a glass or a synthetic plastics material, to have the required configuration.

The invention correspondingly provides a die or roller or a mould for manufacturing the reflective device. The reflective device may also be used in radio-astronomy or the like. With such an application a number of directional vanes disposed normally to the reference line may be used to allow only normal incident waves to be reflected and collected.

The invention will now be described by way of examples, with reference to the accompanying drawings, in which.

Figure 1:
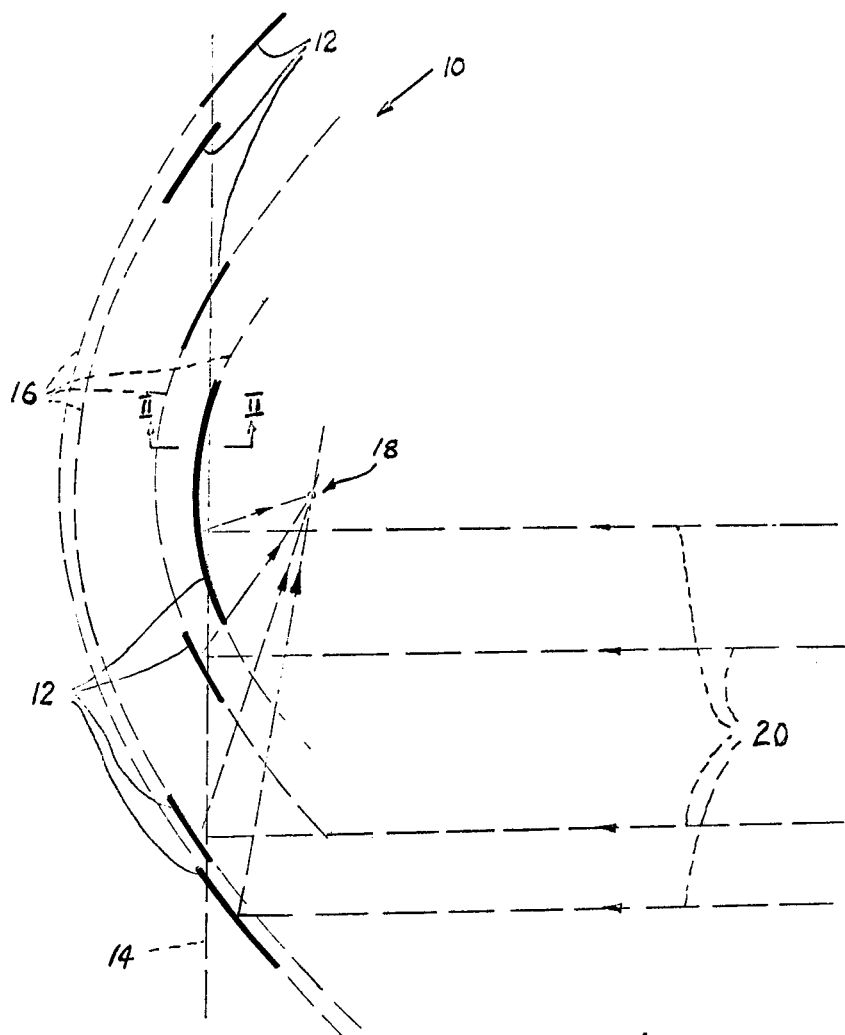
FIG. 1 shows a schematic view of an embodiment of the reflective device.
Figure 2:
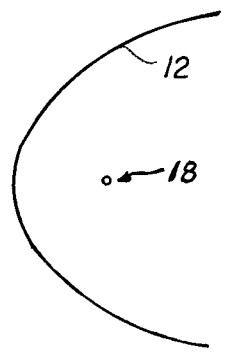
FIG. 2 shows a sectional view along line II—II of FIG. 1.

Referring to FIGS. 1 and 2, a reflective device 10 is shown having a plurality of reflective regions 12 disposed adjacent each other in a stepped arrangement along a reference line 14, so that the device 10 has a linear extended configuration. Each of the reflective regions 12 is a segment of a parabola 16, each parabola 16 having the same focal region 18. Accordingly parallel incident light that is normal to the reference line 14, as shown by the ray loci 20 will be focussed by the reflective regions 12 to the focal region 18. As each reflective region has a parabolic cross-section in a plane normal to the reference line 14, as shown in FIG. 2, then the focal region 18 will be a point. If their cross-section is linear, then the focal region 18 will be a line.

Figure 3:
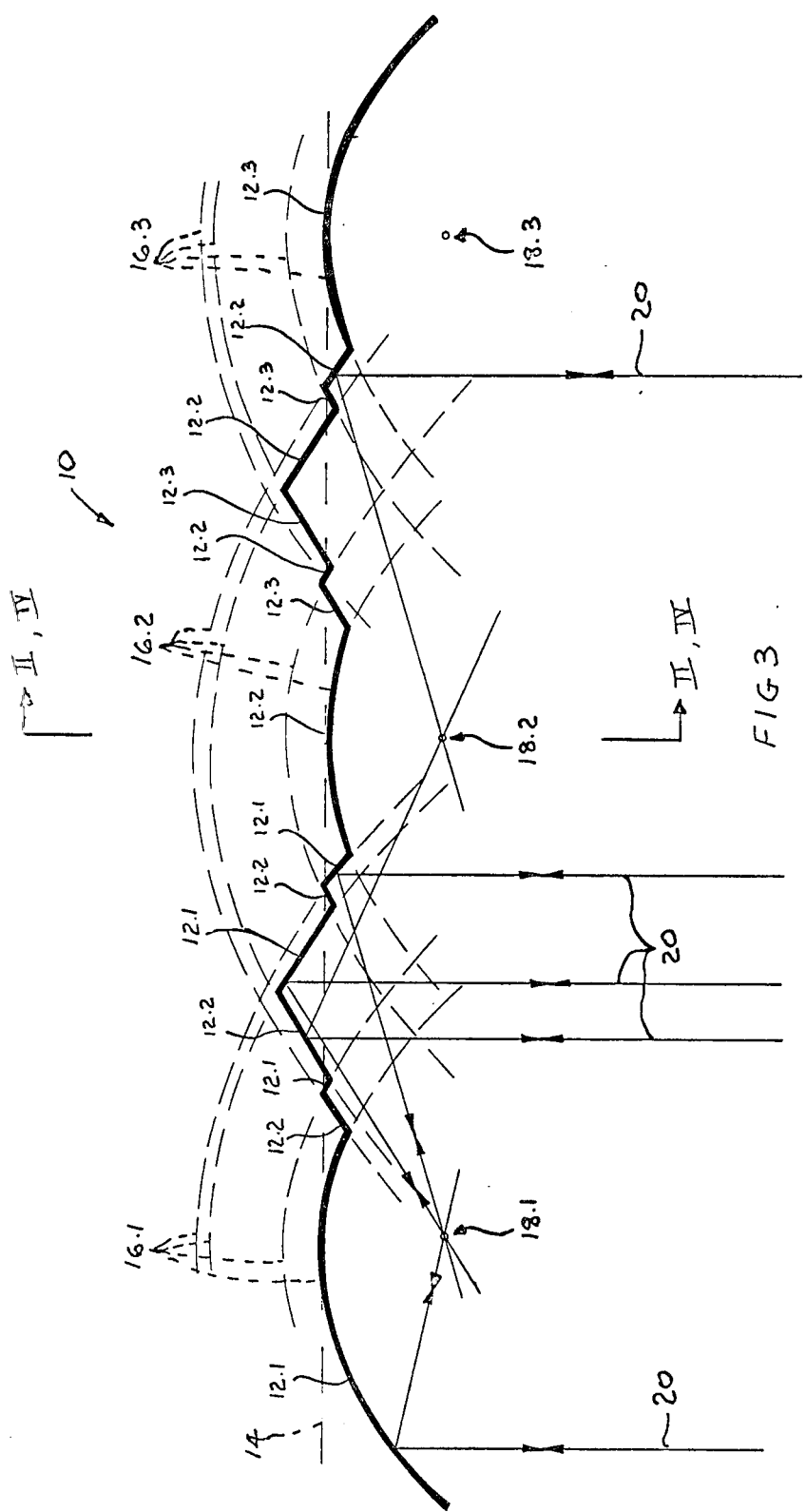
FIG. 3 shows a schematic sectional view of a further embodiment of the reflective device.
Figure 4:
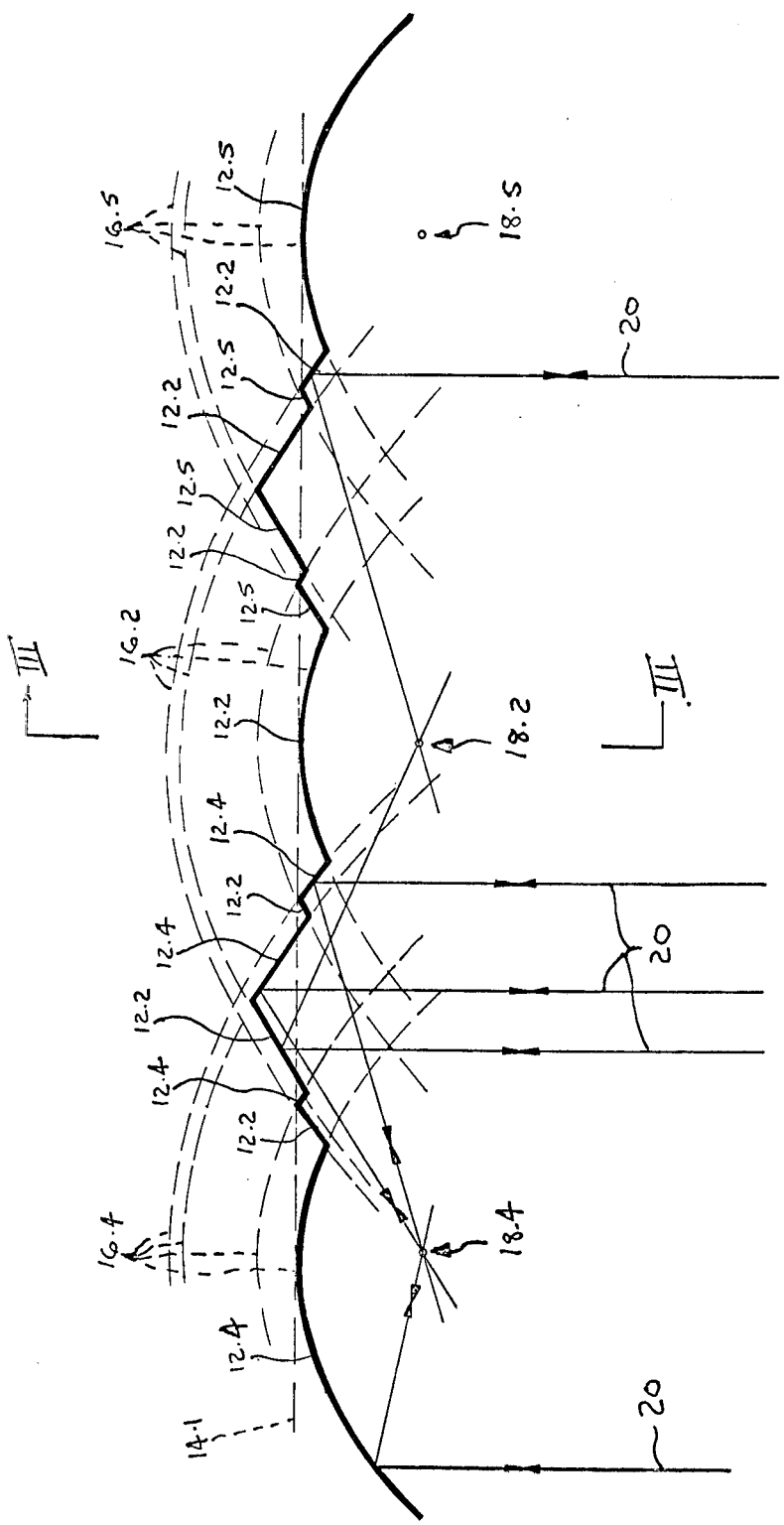
FIG. 4 shows a schematic sectional view along IV—IV in FIG. 3, FIG. 3 being a sectional view along line III—III.

Referring further to FIGS. 3 and 4, a reflective device 10 having three focal regions 18.1, 18.2 and 18.3 is shown. The reflective device 10 includes three sets of reflective regions 12.1, 12.2 and 12.3, each set similar to the reflective regions 12 of FIG. 1. The reflective regions are arranged alternately, i.e. reflective regions from the sets 12.1 and 12.2 are arranged in a zig-zag fashion to give an unbroken reflective surface and similarly with the remaining reflective regions from the set 12.2 and reflective regions from the set 12.3. Accordingly, normal incident light, as indicated by the ray loci 20, will be focussed to one of the focal regions 18.1, 18.2 or 18.3, depending on which reflective region it encounters.

Once again, if the reflective regions 12.1, 12.2 and 12.3 are linear perpendicular to the reference line 14, then the reflective device will have three focal lines.

In this form, the reflective device 10 may conveniently be used as a solar heat concentrator, with pipes carrying a fluid to be heated being aligned co-incidental with the focal lines 18.1, 18.2 and 18.3. With such an arrangement, the device may have a very short focal length to optimise tracking requirements and still concentrate heat energy from a large area.

If the perpendicular cross-section is parabolic, as shown in FIG. 2, then the device 10 will have three focal points 18.1, 18.2 and 18.3.

The reflective device 10 may further have a two-dimensional matrix of focal points. The device 10 of FIG. 3 is shown in FIG. 4 as having a similar configuration in a direction perpendicular to the reference line 14, i.e. each of the reflective regions is dished and further sets of reflective regions 12.4 and 12.5 are provided lying along a reference line 14.1 that is perpendicular to the reference line 14. Further similar sets of reflective regions are provided to form a matrix, such that the reflective device is planar and has a matrix of focal points of which focal points 18.1 to 18.5 are shown.

The embodiment of FIGS. 3 and 4 is rolled from a sheet of reflective, ductile metal, such as aluminum, using suitably formed rollers. Alternatively, the device may be pressed or moulded.

It is understood that the reflective device may have a large number of sets of reflective regions and that only a few have been indicated in the drawings for the sake of clarity.

What is claimed is:

1. A reflective device which includes a plurality of concave reflective regions arranged in sets, with the reflective regions of each set having a single co-incident focal region, the device having as many focal regions as there are sets and any two consecutive reflective regions of one set being separated from each other by a reflective region of another set, the reflective regions being disposed adjacent each other along a reference line to have a linear extended configuration.

2. A reflective device as claimed in claim 1, in which the reflective regions passing through a plane perpendicular to the reference line, have a linear cross-section in said plane, the focal regions each being linear and the device having a planar configuration.

3. A reflective device as claimed in claim 1, in which all the reflective regions passing through a plane perpendicular to the reference line, have a concave cross-section in said plane, the focal regions each being a focal point.

4. A device as claimed in claim 1, which includes a matrix of sets of dished reflective regions, each reflective region being curved in two dimensions, the reflective regions being disposed along parallel reference lines lying in a plane, to form a planar device having a matrix of focal points.

5. A device as claimed in claim 1, in which the reflective regions are parabolic.

6. A device as claimed in claim 1, which is of silvered glass.

7. A receiver for electro-magnetic or acoustical waves having a reflective device as claimed in claim 1.

8. A transmitter for electro-magnetic or acoustical waves having a reflective device as claimed in claim 1.

9. A solar heater having a reflective device as claimed in claim 2, and a plurality of pipes containing a fluid to be heated arranged co-incidentally with the focal lines.

10. A device as claimed in claim 1, which is of a synthetic plastics material.

11. A device as claimed in claim 1, which is of metal.

* * * * *